United States Patent [19]

Harmon

[11] Patent Number: 4,582,373
[45] Date of Patent: Apr. 15, 1986

[54] EXPANSION TERMINAL CONNECTOR
[75] Inventor: Eldred R. Harmon, Pell City, Ala.
[73] Assignee: Square D Company, Palatine, Ill.
[21] Appl. No.: 663,799
[22] Filed: Oct. 23, 1984
[51] Int. Cl.$^4$ .............................................. H01R 4/02
[52] U.S. Cl. .................................................. 339/9 E
[58] Field of Search ........................................ 339/9
[56] References Cited

U.S. PATENT DOCUMENTS

| 3,825,719 | 7/1974 | Jonsson | 339/9 R |
| 4,039,744 | 8/1977 | Seaquist | 174/169 |

FOREIGN PATENT DOCUMENTS

| 1163689 | 3/1984 | Canada | 339/9 E |
| 2606609 | 7/1977 | Fed. Rep. of Germany | 339/9 E |
| 417397 | 10/1934 | United Kingdom | 339/9 E |

OTHER PUBLICATIONS

Burndy Expansion Conn.-Electrical World, p. 50, 1955-01.
Square D Catalog-p. 91-5-1982.

Primary Examiner—Joseph H. McGlynn
Attorney, Agent, or Firm—Stephen A. Litchfield

[57] ABSTRACT

An expansion terminal connector for providing means for accommodating the expansion and contraction of an elongated tubular bus comprising a pair of identical collars having circular openings therein; a pair of elongated flexible straps placed over and adjacent the collars, and adapters placed over the straps and adjacent the collars such that the adapters may be welded to the collars thereby securing the straps to the collars. A guide body is inserted through one of the circular openings in the collar, the guide body having at one end a tongue having openings therein for mounting to a substation assembly, and at the other end a guide for supporting the tubular bus. Intermediate the ends the guide body has a flat circular portion designed to correspond to the diameter of the circular opening in the collar. The circular portion of the guide body is welded to the collar to form a secure connection between the guide body and the collar. A tubular bus is then inserted into the circular opening of the other collar and over the guide and welded in place thus providing the expansion terminal connector of the present invention.

8 Claims, 10 Drawing Figures

EXPANSION TERMINAL CONNECTOR

BACKGROUND OF THE INVENTION

This invention relates to expansion terminal connectors for use in power station assembles and applications. In particular, this invention relates to expansion terminal connectors providing means by which a terminal deadend may expand and contract for changes in a tubular bus during temperature changes in the field.

Prior art expansion terminal connectors have comprised a single piece terminal assembly, a pair of expansion straps or shunts, and a single piece collar. The terminal was formed of a casting and comprised a tongue with a main body and an extension portion or guide body designed to fit within the tubular section of the bus to hold the bus in position and yet allow for the bus to expand and contract along its length. The collar portion would generally be welded to the bus at a distance removed from the terminal portion. The straps or shunts would be connected at both ends of the collar and the terminal to provide for electrical connection between the bus and the terminal and to allow for the expansion and contraction of the bus along its length. The straps or shunts are generally inserted into openings provided in both the terminal end and the collar where they are then welded in place at the factory. Often times the tongue portion of the terminal which is a flat plate-like portion having means for connecting the tongue to other portions of the substation, is desired to be mounted in either a horizontal or vertical arrangement with respect to the remainder of the terminal connector. Since the terminal with the tongue is a one piece casting, rearrangement of the tongue means that a second casting must be used. Also, since the collar portion which is welded to the tubular bus is of a different design than the terminal end of the connector, a separate casting is required for this piece also. Further, many times the strap thickness varies due to varying voltage requirements of the system or due to differing specifications required by utility companies. Since the openings in the collar and the terminal for the straps to be placed therein are formed in a one piece casting, different size cores are required for each varying size of the strap thickness. In the manufacturing process this entails a wide variety of cores, molds, and other items necessary to vary the individual components of the terminal connector to the specified need. This complicates and lengthens the manufacturing process of the terminal connector. Such complications provide for increased costs and a reduction in efficiency in the manufacture of the product. Therefore, there is a need in the field for an expansion terminal connector which will accommodate varying strap thickness, without the need for mold or core changes. Further, there is a need in the field for an expansion terminal connector which will accommodate both a vertical and horizontal tongue at the terminal end, again without the need for changes in the molding of the part. Also, there is a need in the field for an expansion terminal connector which reduces the number of varied cores and castings required to assemble the product.

SUMMARY OF THE INVENTION

The aforementioned needs are satisfied by providing an expansion terminal connector which has the following objects:

It is an object of the present invention to provide a expansion terminal connector which will accommodate varying strap thickness without the need for modifying the molds or cores during the manufacture of the components of the terminal connector. It is a further object of the invention to accommodate either a vertical or horizontally arranged tongue without the need for modifying the mold for the product. It is also an object of the invention to provide a expansion terminal connector which requires a reduced number of varied, casting components in the assembly process.

The above objects are met by providing an expansion terminal connector having a pair of identical collars, each collar having a rounded opening area for receiving therein either the tubular bus or a separate tongue and expansion portion of the connector assembly. Since the collars are identical they may be made from the same mold. A single piece tongue and expansion portion, called a guide body, are made from another mold. The tongue has a flat portion with mounting holes therein, integrally formed to a rounded portion having a diameter similar in that to the tubular bus. The elongated expansion portion called a guide arm has at its distal end a stabilizing means for stabilizing the bus mounted thereover called a guide. A single casting is made of a strap mounting member which has a substantially C-shape and is designed such that it will fit over a raised portion of the collar. The strap mounting member has an elongated portion under which the strap or shunt is fitted for mounting purposes. This elongated portion corresponds to a similar elongated portion on the collar which the other side of the strap rests when the collar is in place. Through a series of either field or factory welds the expansion terminal connector is assembled. Since the strap mounting member comprises separate piece, not integrally formed with the collar, it is possible to adjust the strap mounting piece to the thickness of the strap prior to its welding to the collar.

In assemblying the device, the straps or shunts are placed in the appropriate position over the elongated portions of the collar. The collar mounting members are placed over the straps and welded to the collar. The straps themselves are also welded to both the collar and the strap mounting member. The tongue and expansion portion are fitted into one end of the terminal connector such that the rounded portion of the tongue fits within the rounded opening of the collar. The tongue is then welded to the collar. Since the tongue is welded to the collar its positioning with respect to the straps may be arranged at that time. If a horizontal weld is desired, the tongue is simply rotated in the collar to the horizontal position. If a vertical position of the tongue is desired, the tongue is simply rotated to the vertical position with respect to the straps and welded in place. In the field the entire assembly is then mounted onto a tubular bus and may be field welded to the bus.

In this manner the objects aforementioned are met and a more efficiently and economically manufactured expansion terminal connector is produced.

DESCRIPTION OF THE DRAWINGS

The features of the present invention which are believed to be novel are set forth with particularity in the appended claims. The invention together with further objects and advantages thereof may best be understood by reference to the following description taken in conjunction with the accompanying drawings in the several figures of which like reference numerals identify like elements and in which:

DETAILED DESCRIPTION

Figure 1:
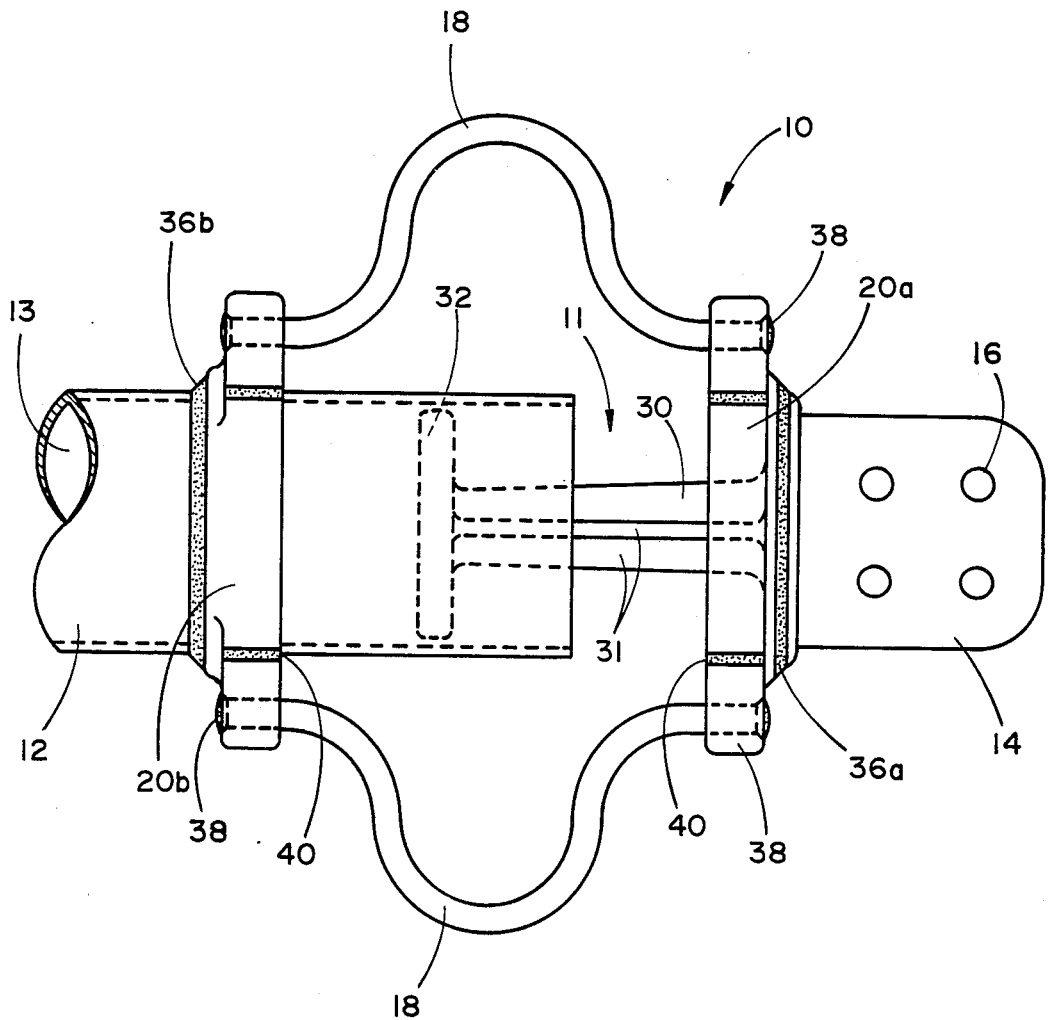
FIG. 1 is a side view of the assembled expansion terminal connector.

FIG. 1 of the drawings illustrates in side view the expansion terminal connector of the present invention. It should be noted that the terminal connector 10 comprises a guide body 11 disposed within collar 20a and welded thereto at collar weld 36a. Guide body 11 has tongue 14 integrally formed therewith, guide arm 30 also integrally formed therewith and guide 32. The guide body 11 will be discussed in more detail in FIGS. 4, 5, and 6 below. Terminal connector 10 has bus 12 shown inserted into guide 32 through collar 20b. Tubular bus 12 is shown welded at collar weld 36b to the collar 20b. Expansion straps 18, also called shunts, are shown connected to collars 20a and 20b at mounting member welds 40. The mounting members 28, also called adapters, serve to compress the straps 18 against an end of collars 20. Straps are held to the adapters 28 and collars 20 by virtue of strap welds 38.

Guide body 11 is welded at collar weld 36a to collar 20a. The welding shown in FIG. 1 serves to connect the various components of the terminal connector into a single integrated piece to provide for the expansion and contraction of the tubular bus as necessary.

Figure 2:
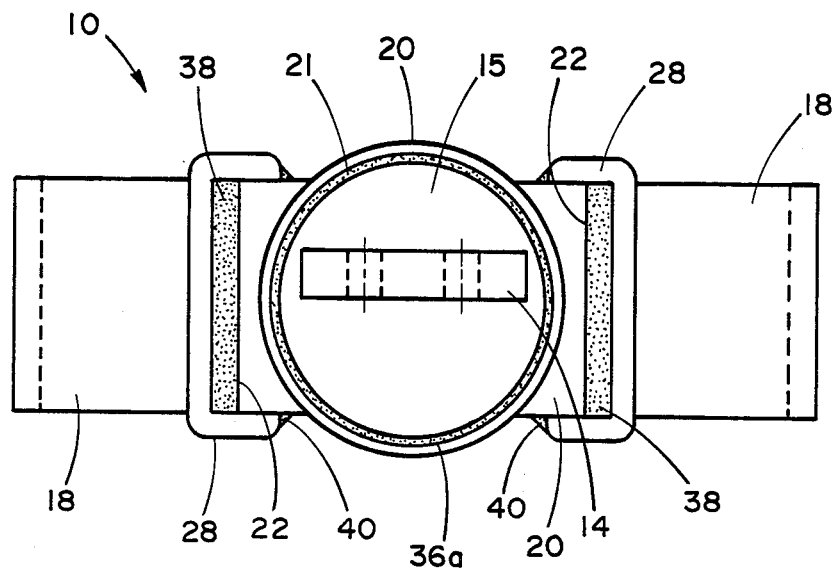
FIG. 2 is an end view of the assembled terminal connector.

Referring to FIG. 2 it is seen that adapters 28 fit over the elongated collar area 22 with strap 18 ends disposed therebetween. Strap welds 38 are shown in better detail with respect to the relationship of adapters 28 and collars 20. Adapter or mounting member welds 40 are shown connecting the adapters 28 to the collar 20. Circular plate 15 is shown disposed within the circular opening 21 of collar 20. Collar weld 36a is shown connecting circular plate 15 to the circular collar opening 21.

Figure 3:
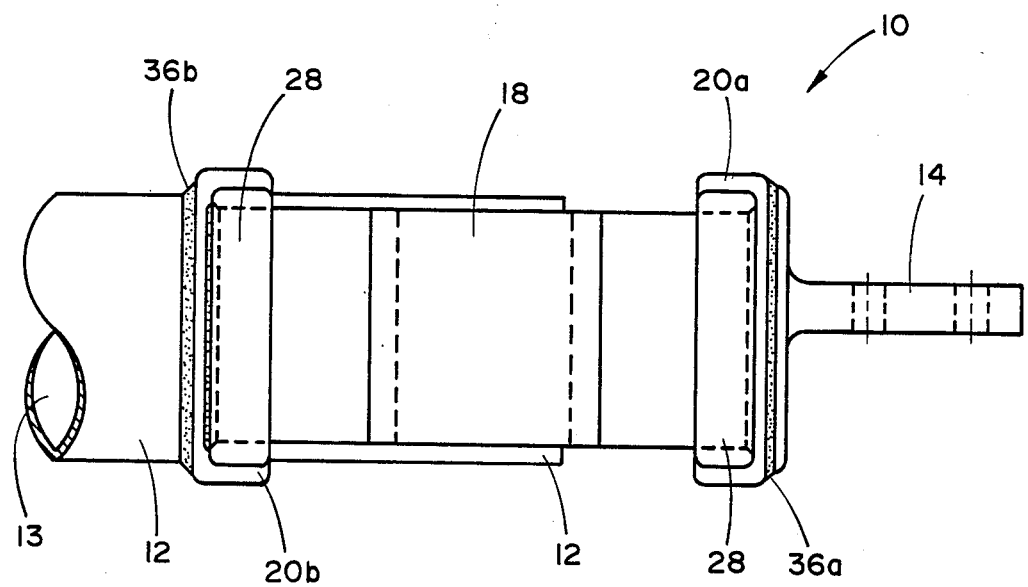
FIG. 3 is a top view of the assembled terminal connector.

FIG. 3 illustrates the expansion terminal connector 10 viewed from the top with bus 12 inserted through collar 20b having adapter 28 secured over strap 18. Collar weld 36b is shown connecting the collar 20b to the tubular bus 12. Adapter 28 is also shown connecting strap 18 to collar 20a.

Figure 4:
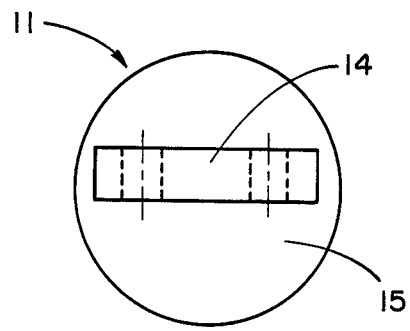
FIG. 4 is an end view of the guide body.
Figure 5:
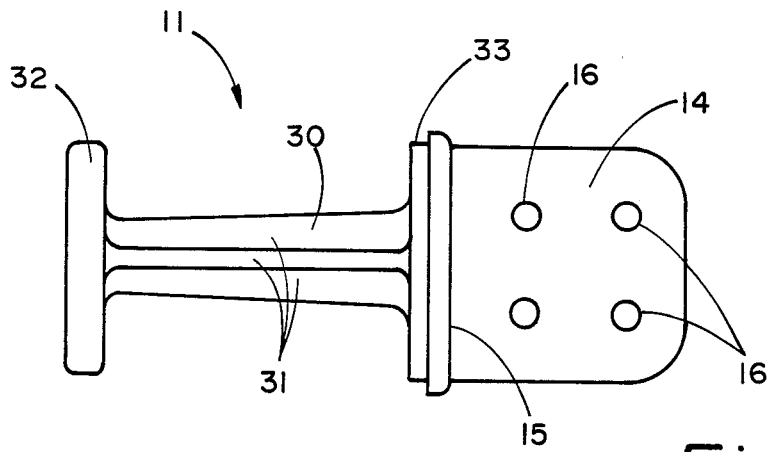
FIG. 5 is a side view of the guide body.

In FIG. 4 the circular plate 15 is shown in greater detail. It should be noted that tongue 14 is integrally formed on circular plate 15. FIG. 5 illustrates the side view of the guide body 11 and indicates that it is an integrally formed single piece. Guide body 11 has tongue 14 at one end thereof. Tongue 14 has tongue openings 16 therein to provide for the connection of the terminal connector 10 to an appropriate substation assembly. Tongue 14 is integrally formed with circular plate 15 which has step portion 33 therein for aiding insertion of the circular plate 15 into the collar circular opening 21 of collar 20. Guide body 11 has guide arm 30 also integrally formed onto circular plate 15 and extending therefrom. Guide arm 30 has ribs 31 formed thereon. In the embodiment disclosed herein, guide arm 30 is comprised of four equally spaced ribs 31. However, it should be noted that other shapes of a guide body 30 design would suffice in the present application. Guide 32 is shown at the distal end of guide arm 30. Guide 32 is received within bus opening 30 of the tubular bus 12 and acts to stabilize the bus with respect to the terminal connector.

Figure 6:
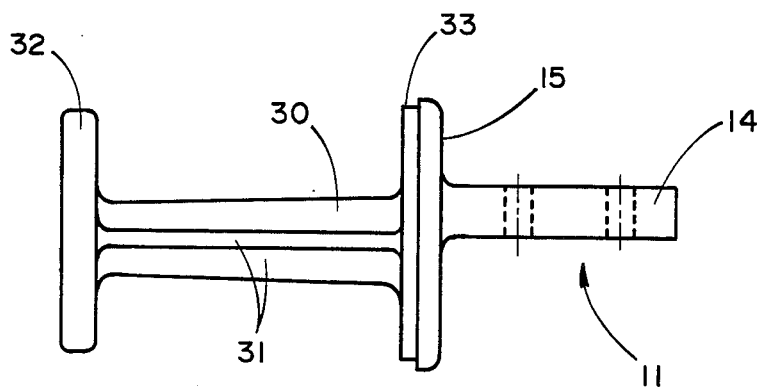
FIG. 6 is a top view of the guide body.

FIG. 6 illustrates the top view of the guide body 11. It should be noted that since the guide body 11 is a separate, integral piece which is inserted into the collar opening 21 of collar 20 the location of the tongue 14 with respect to the straps may be varied. This location may be varied simply by rotating the guide body 11 within the circular opening 21 to the position that is desired for assembly of the terminal connector. Thus, a single manufactured guide body 11 may serve in either a horizontal or vertical application in the terminal connector assembly.

Figure 7:
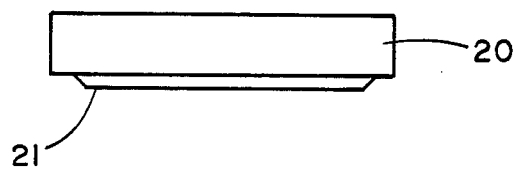
FIG. 7 is a top view of the collar.
Figure 8:
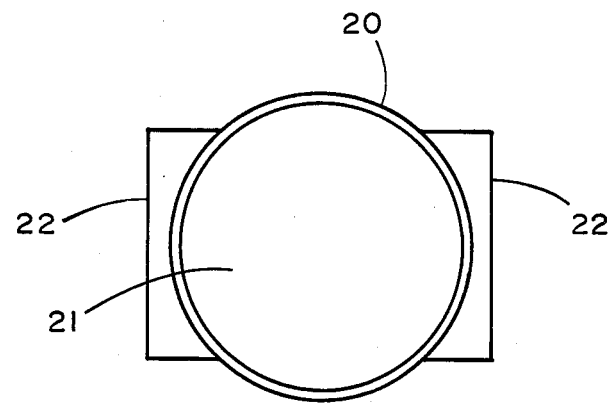
FIG. 8 is an end view of the collar.
Figures 9, 10:
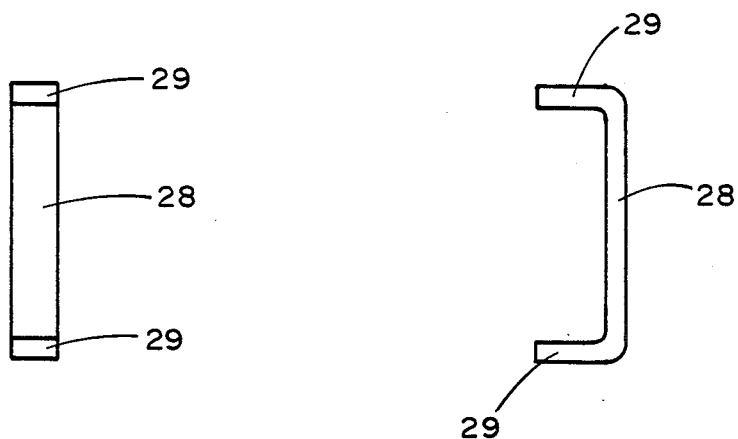
FIG. 9 is a bottom view of the strap mounting member.
FIG. 10 is a side view of the strap mounting member.

FIGS. 7 and 8 illustrate the collar 20. It should be noted that in FIGS. 1, 2, and 3 collar 20 is referred to as collars 20a and 20b. This is done only so that the collar locations can be differentiated with respect to the tubular bus 12 and the guide body 11. It is intended in the present invention that the collar design 20, shown in FIGS. 7 and 8 be identical. In other words, collar 20a and collar 20b are identical collars made from a similar mold. Thus, a single manufactured collar 20 may be used either as a collar to receive the guide body 11 or a collar to receive the tubular bus 12. FIG. 8 illustrates the collar 20 having collar opening 21 and elongated ends 22. Elongated ends 22 are the ends that receive the strap 18 and which have adapter or strap mounting member 40 disposed thereover. FIGS. 9 and 10 illustrate the bottom and side views of the strap mounting member 8, also called adapter 28. It is seen that the adapter 28 is substantially C-shaped but has an intermediary elongated portion. This elongated portion corresponds with the elongated collar area 22 shown in FIG. 8. Adapter 28 has C-shaped ends 29 at each end thereof. As with the collar 20, adapter 28 is made from a single mode and may be used on any one of the four locations of the terminal connector assembly. Thus, one mold may provide the part for securing the strap to the collar on both the guide and tongue end of the connector assembly and at the bus end of the connector assembly.

This invention is not limited to the particular details of construction of the device depicted and other modifications and applications are contemplated. For example, the ribs 31 shown on the guide arm 30 may be modified or eliminated altogether. Also, the guide 32 may have a shape other than that shown and still provide the necessary support and interaction with the tubular bus 12. Also, the tongue shape may change in accordance with the needs of the connection to the substation required. Certain other changes may be made in the above described device without departing from the true spirit and scope of the invention herein involved. It is intended therefore that the subject matter in the above depiction shall be interpreted as illustrative and not in a limiting sense.

I claim:

1. A connector assembly for a tubular bus comprising a pair of identical collars, each collar having an opening therein; a guide body having two ends, a terminal assembly at one end thereof and a means for supporting a tubular bus at the other end, said guide body having disposed between said ends a portion for receipt into a collar opening in one of the collars; the opening in the other of said collars for receipt of a tubular bus therein; a pair of elongated straps, each strap having two distal ends for connection to the collars and two pairs of adapters, each adapter to be placed over each distal end of each strap and adjacent the collar such that each adapter may be secured to the collar and where the adapters comprise an elongate casting having two ends, each end having a substantially normal protrusion therefrom such that the adapter is receivable over the strap end and collar for securing the strap to the collar; and such that the adapters will accommodate straps of varying thicknesses when said straps are secured to the collars;

means for securing the guide portion to the collar opening, and means for securing the adapters to the collars when placed over the straps.

2. The connector assembly of claim 1 where the means for securing the guide portion to the collar comprises a weld joining the collar to the guide body.

3. The connector assembly of claim 1 where the means for securing the adapters to the collars comprises a weld joining the collar to the adapter.

4. The connector assembly of claim 1 where the strap is secured to both the collar and the adapter by a weld at the distal end of each strap.

5. The connector assembly of claim 1 where either collar opening may receive the guide portion or the tubular bus.

6. The connector assembly of claim 1 where the terminal assembly comprises a relatively planar portion integrally formed to the guide portion and normal thereto, having a series of mounting openings formed therein.

7. The connector assembly of claim 1 where the means for supporting the bus comprises an elongate portion integrally formed to the guide portion and substantially normal thereto, and a guide integrally formed to the elongate portion at an end opposite the guide portion.

8. The connector apparatus of claim 1 where the guide portion comprises a circular plate.

* * * * *